US009110606B2

(12) United States Patent
Yoon et al.

(10) Patent No.: US 9,110,606 B2
(45) Date of Patent: Aug. 18, 2015

(54) METHOD AND APPARATUS FOR ACCESSING HOME STORAGE OR INTERNET STORAGE

(75) Inventors: Hyun-sik Yoon, Songpa-gu (KR);
Joon-ho Cho, Suwon-si (KR);
Kyoung-hoon Yi, Dongjak-gu (KR);
Sang-hoon Choi, Dongjak-gu (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 1390 days.

(21) Appl. No.: 11/649,258

(22) Filed: Jan. 4, 2007

(65) Prior Publication Data

US 2007/0156899 A1 Jul. 5, 2007

(30) Foreign Application Priority Data

Jan. 4, 2006 (KR) ........................ 10-2006-0000968

(51) Int. Cl.
*G06F 15/16* (2006.01)
*G06F 3/06* (2006.01)
*H04L 12/28* (2006.01)

(52) U.S. Cl.
CPC .............. *G06F 3/0664* (2013.01); *G06F 3/067* (2013.01); *G06F 3/0617* (2013.01); *H04L 12/2836* (2013.01); *H04L 12/2816* (2013.01)

(58) Field of Classification Search
USPC .................. 709/217–219, 224, 229, 208, 212
See application file for complete search history.

(56) References Cited

U.S. PATENT DOCUMENTS

| 5,771,354 | A  | * | 6/1998  | Crawford ...................... 709/229 |
| 6,029,231 | A  |   | 2/2000  | Blumenau |
| 6,226,649 | B1 | * | 5/2001  | Bodamer et al. .............. 709/203 |
| 6,345,368 | B1 | * | 2/2002  | Bergsten .......................... 714/11 |
| 6,381,602 | B1 | * | 4/2002  | Shoroff et al. ................ 707/741 |
| 6,754,712 | B1 | * | 6/2004  | Valencia ....................... 709/227 |
| 6,779,035 | B1 | * | 8/2004  | Gbadegesin ................. 709/228 |
| 6,826,615 | B2 | * | 11/2004 | Barrall et al. ................. 709/227 |
| 6,938,031 | B1 | * | 8/2005  | Zoltan et al. ................. 707/771 |
| 6,956,833 | B1 | * | 10/2005 | Yukie et al. ................... 370/328 |
| 7,010,657 | B2 | * | 3/2006  | Lowe et al. ................... 711/165 |
| 7,194,590 | B2 | * | 3/2007  | Achiwa et al. ................ 711/162 |
| 7,254,636 | B1 | * | 8/2007  | O'Toole et al. ............... 709/230 |
| 7,266,556 | B1 | * | 9/2007  | Coates ................................. 1/1 |
| 7,325,040 | B2 | * | 1/2008  | Truong ......................... 709/217 |
| 7,349,913 | B2 | * | 3/2008  | Clark et al. ........................... 1/1 |

(Continued)

FOREIGN PATENT DOCUMENTS

| CN | 1322315 A | 11/2001 |
| CN | 1518422 A | 5/2003 |

(Continued)

OTHER PUBLICATIONS

Communication dated Mar. 21, 2012 issued by the Japanese Patent Office in counterpart Japanese Application No. 2007-000261.

(Continued)

*Primary Examiner* — Michael Y Won
(74) *Attorney, Agent, or Firm* — Sughrue Mion, PLLC

(57) ABSTRACT

A method and apparatus are provided for accessing an Internet storage. In the method, access to a home storage is controlled, and an internet storage which has higher access reliability than the home storage is accessed, if the access to the home storage is not available. Accordingly, even when the home storage is not in operation, it is possible to obtain content and meta data of the content.

20 Claims, 11 Drawing Sheets

(56) References Cited

U.S. PATENT DOCUMENTS

| | | | |
|---|---|---|---|
| 7,366,856 B2* | 4/2008 | Leon et al. | 711/161 |
| 7,568,222 B2* | 7/2009 | Randle et al. | 726/8 |
| 7,577,689 B1* | 8/2009 | Masinter et al. | 1/1 |
| 7,664,652 B2* | 2/2010 | Piccionelli et al. | 705/311 |
| 7,707,367 B1* | 4/2010 | Tran et al. | 711/154 |
| 7,769,722 B1* | 8/2010 | Bergant et al. | 707/681 |
| 7,813,936 B2* | 10/2010 | Piccionelli et al. | 705/1.1 |
| 7,827,116 B2* | 11/2010 | Piccionelli et al. | 705/317 |
| 7,870,294 B2* | 1/2011 | Braddy et al. | 709/246 |
| 7,991,840 B2* | 8/2011 | Boyer et al. | 709/205 |
| 8,005,816 B2* | 8/2011 | Krishnaprasad et al. | 707/709 |
| 8,027,982 B2* | 9/2011 | Ture et al. | 707/741 |
| 8,239,589 B1* | 8/2012 | Certain et al. | 710/39 |
| 2002/0026560 A1 | 2/2002 | Jordan et al. | |
| 2002/0078161 A1* | 6/2002 | Cheng | 709/208 |
| 2002/0161826 A1* | 10/2002 | Arteaga et al. | 709/203 |
| 2002/0163910 A1* | 11/2002 | Wisner et al. | 370/389 |
| 2002/0174236 A1* | 11/2002 | Mathur et al. | 709/229 |
| 2003/0026249 A1* | 2/2003 | Ikawa | 370/360 |
| 2003/0105810 A1* | 6/2003 | McCrory et al. | 709/203 |
| 2003/0126239 A1* | 7/2003 | Hwang | 709/220 |
| 2003/0191802 A1 | 10/2003 | Zhao et al. | |
| 2003/0220903 A1* | 11/2003 | Mont et al. | 707/1 |
| 2004/0246992 A1 | 12/2004 | Henry et al. | |
| 2005/0097440 A1* | 5/2005 | Lusk et al. | 715/500.1 |
| 2006/0048153 A1* | 3/2006 | Truong | 718/100 |
| 2006/0143332 A1* | 6/2006 | Yagi et al. | 710/38 |
| 2006/0173951 A1* | 8/2006 | Arteaga et al. | 709/203 |
| 2006/0240770 A1 | 10/2006 | Shima et al. | |
| 2006/0271530 A1* | 11/2006 | Bauer | 707/5 |
| 2007/0033190 A1* | 2/2007 | Dodaro et al. | 707/9 |
| 2007/0067670 A1* | 3/2007 | Ebsen et al. | 714/7 |
| 2007/0300222 A1* | 12/2007 | Sincaglia et al. | 718/1 |
| 2009/0022129 A1* | 1/2009 | Karaoguz et al. | 370/338 |
| 2009/0037522 A1* | 2/2009 | Ozawa et al. | 709/203 |
| 2011/0119449 A1* | 5/2011 | Neerincx et al. | 711/133 |

FOREIGN PATENT DOCUMENTS

| | | | |
|---|---|---|---|
| CN | 1545781 | A | 11/2004 |
| CN | 1647074 | A | 7/2005 |
| JP | 2003-296167 | A | 10/2003 |
| JP | 2005-204087 | A | 7/2005 |
| KR | 2000-0008981 | A | 2/2000 |
| KR | 10-2002-0046410 | A | 6/2002 |
| KR | 10-2005-0094286 | A | 9/2005 |
| WO | 01/58163 | A2 | 8/2001 |
| WO | 2005/045682 | A1 | 5/2005 |

OTHER PUBLICATIONS

Communication dated Sep. 11, 2012 issued by the Japanese Patent Office in counterpart Japanese Patent Application No. 2007-000261.

Stoica, et al., "Chord, A Scalable Peer-to-peer Lookup Service for Internet Applications", MIT Laboratory for Computer Science, 2001, pp. 1-12.

Ratnasamy, et al., "A Scalable Content-Addressable Network", 2001, pp. 161-172.

Kubiatowicz, et al., "OceanStore: An Architecture for Global-Scale Persistent Storage", University of California, Berkeley, 2000, pp. 1-12.

Dabek, et al., "Building Peer-to-Peer Systems With Chord, a Distributed Lookup Service", MIT Laboratory for Computer Science, 6 pgs total.

Communication dated Mar. 23, 2011 issued by the State Intellectual Property of P.R. China counterpart Chinese Patent Application No. 201010147710.9.

Communication dated Jun. 26, 2013, issued by the European Patent Office in counterpart European Application No. 06127371.0.

Anonymous: "Web cache-Wikipedia, the free encyclopedia", Dec. 31, 2005, http://en.wikipedia.org/w/index.php?title=Web_cache&oldid=33331765, 2 pages.

Anonymous: "Proxy server—Wikipedia, the free encyclopedia", Jan. 3, 2006, htp://en.wikipedia.org/w/index.php?title=Proxy_server&oldid=33773489, 5 pages.

Communication dated Jan. 21, 2015, issued by the European Patent Office in counterpart European Application No. 06127371.0.

* cited by examiner

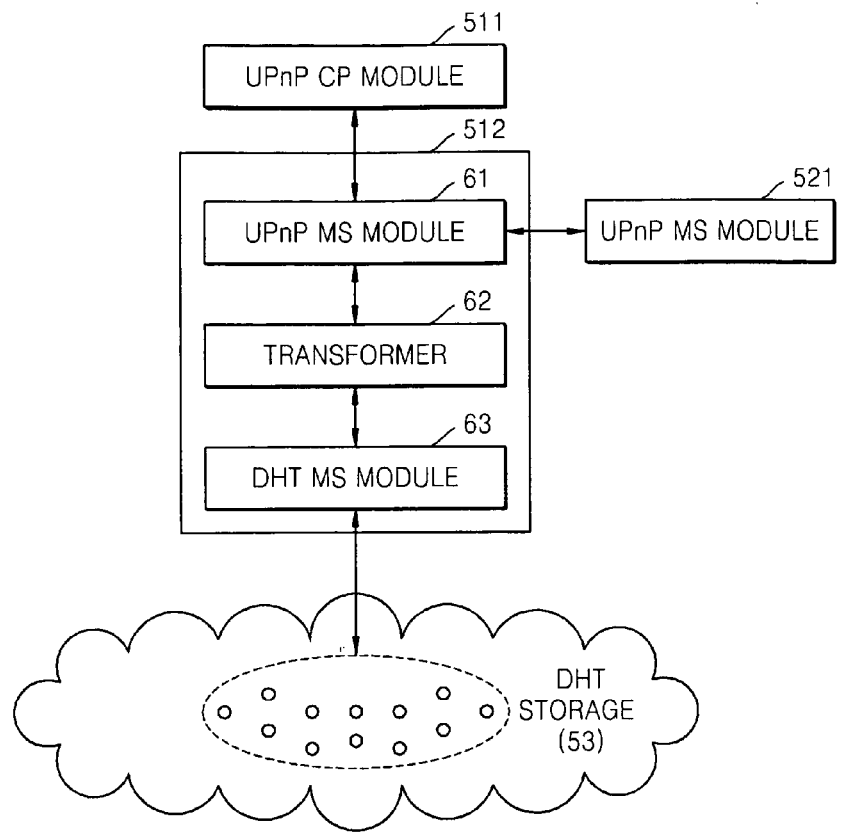

FIG. 8

```xml
<?xml version="1.0"?>
<root xmlns="urn:schemas-upnp-org:device-1-0">
  <specVersion>
    <major>1</major>
    <minor>0</minor>
  </specVersion>
  <URLBase>base URL for all relative URLs</URLBase>
  <device>
    <deviceType>urn:schemas-upnp-org:device:MediaServer:1</deviceType>
    <friendlyName>short user-friendly title</friendlyName>
    <manufacturer>manufacturer name</manufacturer>
    <manufacturerURL>URL to manufacturer site</manufacturerURL>
    <modelDescription>long user-friendly title</modelDescription>
    <modelName>model name</modelName>
    <modelNumber>model number</modelNumber>
    <modelURL>URL to model site</modelURL>
    <serialNumber>manufacturer's serial number</serialNumber>
    <UDN>uuid:UUID</UDN>
    <UPC>Universal Product Code</UPC>
    <iconList>
      <icon>
        <mimetype>image/format</mimetype>
        <width>horizontal pixels</width>
        <height>vertical pixels</height>
        <depth>color depth</depth>
        <url>URL to icon</url>
      </icon>
      XML to declare other icons, if any, go here
    </iconList>
    <serviceList>
      <service>
        <serviceType>urn:schemas-upnp-org:service:ContentDirectory:1</serviceType>
        <serviceId>urn:upnp-org:serviceId:ContentDirectory</serviceId>
        <SCPDURL>URL to service description</SCPDURL>
        <controlURL>URL for control</controlURL>
        <eventSubURL>URL for eventing</eventSubURL>
      </service>
      <service>
        <serviceType>urn:schemas-upnp-org:service:ConnectionManager:1</serviceType>
        <serviceId>urn:upnp-org:serviceId:ConnectionManager</serviceId>
        <SCPDURL>URL to service description</SCPDURL>
        <controlURL>URL for control</controlURL>
        <eventSubURL>URL for eventing</eventSubURL>
      </service>
      <service>
        <serviceType>urn:schemas-upnp-org:service:AVTransport:1</serviceType>
        <serviceId>urn:upnp-org:serviceId:AVTransport</serviceId>
        <SCPDURL>URL to service description</SCPDURL>
        <controlURL>URL for control</controlURL>
        <eventSubURL>URL for eventing</eventSubURL>
      </service>
      Declarations for other services added by UPnP vendor (if any) go here
    </serviceList>
    <deviceList>
      Description of embedded devices added by UPnP vendor (if any) go here
    </deviceList>
    <presentationURL>URL for presentation</presentationURL>
  </device>
</root>
```

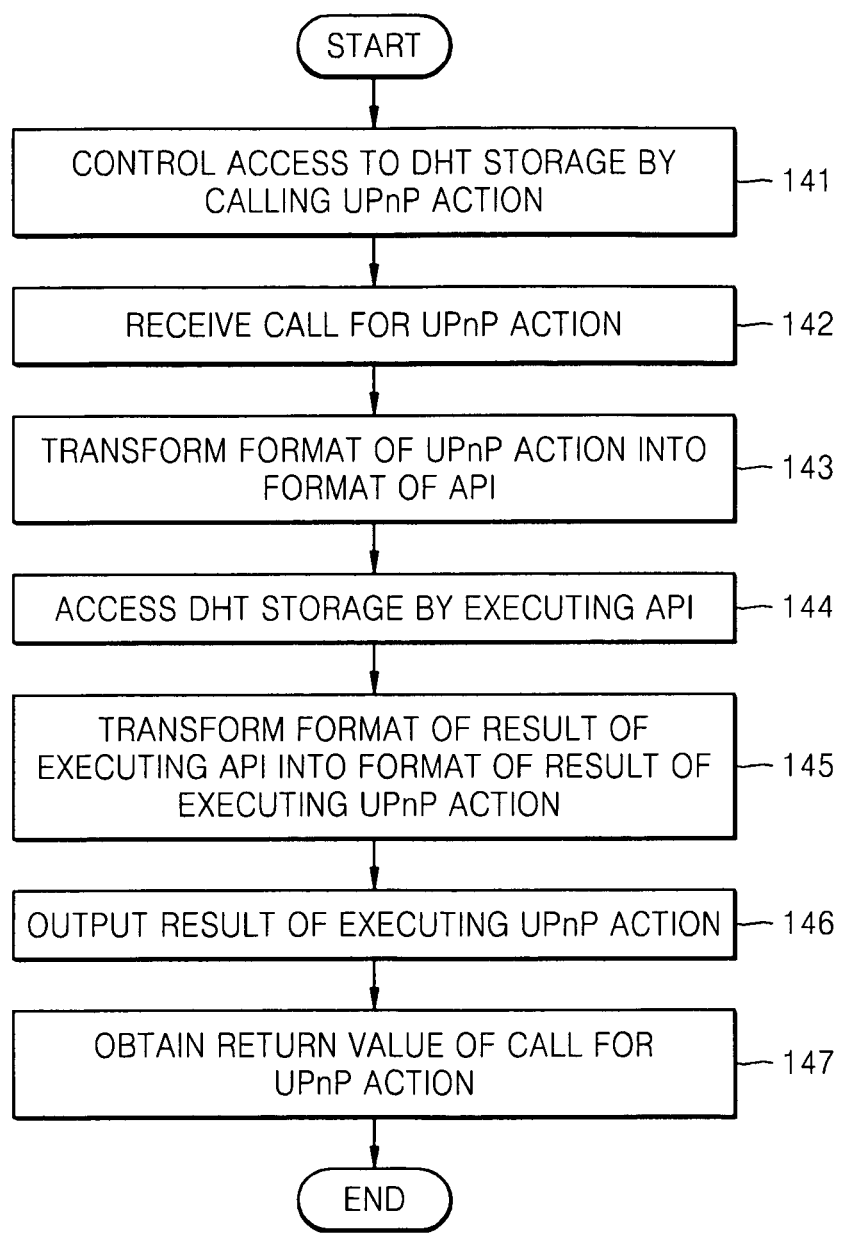

METHOD AND APPARATUS FOR ACCESSING HOME STORAGE OR INTERNET STORAGE

CROSS-REFERENCE TO RELATED PATENT APPLICATIONS

This application claims priority from Korean Patent Application No. 10-2006-0000968, filed on Jan. 4, 2006, in the Korean Intellectual Property Office, the disclosure of which is incorporated herein in its entirety by reference.

BACKGROUND OF THE INVENTION

1. Field of the Invention

Methods and apparatuses consistent with the present invention relate to accessing an Internet storage, and more particularly, to accessing a Distributed Hash Table (DHT) storage according to Universal Plug and Play (UPnP) standards.

2. Description of the Related Art

FIGS. 1 and 2 are block diagrams of related art home storage environments according to Universal Plug and Play (UPnP) standards. The related art storage environment of FIG. 1 includes a UPnP Control Point (CP) 11 and a UPnP Media Server (MS) 12. In general, a storage device of the UPnP MS 12 stores content and meta data of the content. The UPnP CP 11 controls acquisition of the content by controlling access to the storage device of the UPnP MS 12.

The home storage environment of FIG. 2 includes a UPnP CP 21, a first UPnP MS 22, a second UPnP MS 23, and a central server 24. In general, content and meta data of the content are stored in storage devices of the first and the second UPnP MSs 22 and 23, and copies of the stored content and meta data of the stored content are stored in a storage device of the central server 24. The UPnP CP 21 controls acquisition of the content by controlling access to the storage devices of the first and the second UPnP MSs 22 and 23. However, when the first and the second UPnP MSs 22 and 23 are not in operation, the UPnP CP 21 controls acquisition of the content by controlling access to the storage device of the central server 24.

FIG. 3 is a block diagram of a related art Internet storage environment. Referring to FIG. 3, the related art Internet storage environment includes a first client 31, a second client 32, and a central server 33. In general, content and meta data of the content are stored in an Internet storage of the central server 33. Examples of the Internet storages are a picture sharing system provided by an Internet service provider (ISP), and an Internet disk service provided at http://idisk.megapass.net. The first and the second clients 31 and 32 request the central server 33 to provide the content, and obtain the content in response to the request.

As described above, a variety of related art storage environments exist at present. However, a drawback of the home storage environment of FIG. 1 is that it is impossible to access the storage device of the UPnP MS 12 when the UPnP MS 12 is not in operation. The home storage environment of FIG. 2 is better than the home storage environment of FIG. 1, but when both the first (or the second) UPnP MS 22 (or 23) and the central server 24 are not in operation, it is also impossible to access the storage devices thereof. In the Internet storage environment of FIG. 3, storage access is not limited since ISPs directly provide Internet storage services, but content is uploaded and downloaded via the Internet, thus increasing Internet traffic.

SUMMARY OF THE INVENTION

The present invention provides a method and apparatus for allowing content and meta data of the content to be acquired even when access to a home storage is not available.

The present invention also provides a computer readable medium having recorded thereon a computer program for executing the method.

According to an aspect of the present invention, there is provided a method of accessing storage comprising controlling access to a first storage, and accessing a second storage having higher access reliability than the first storage, if the access to the first storage is not available.

According to another aspect of the present invention, there is provided a storage access apparatus comprising a control module which controls access to a first storage, and a server proxy which accesses a second storage having higher access reliability than the first storage, if the access to the first storage is not available.

According to another aspect of the present invention, there is provided a computer readable medium having recorded thereon a computer program for executing the storage access method.

According to another aspect of the present invention, there is provided a method of accessing storage comprising performing an operation of a server proxy as a server accessing a first storage in place of a server module accessing the first storage, and accessing a second storage having higher access reliability than the first storage, corresponding to the operation performed by the server proxy.

According to another aspect of the present invention, there is provided a storage access apparatus comprising a first server module which acts as a server accessing a first storage in place of an existing server module accessing the first storage; and a second server module which accesses a second storage having higher access reliability than the first storage, corresponding to an operation performed by the first server module.

According to another aspect of the present invention, there is provided a computer readable medium having recorded thereon a computer program for executing the second storage access method.

According to another aspect of the present invention, there is provided a method of accessing storage comprising receiving access control to a storage in a format according to first standards, transforming the access control to the storage from the format according to the first standards into a format according to second standards, and accessing the storage using the access control having the transformed format according to the second standards.

According to another aspect of the present invention, there is provided a storage access apparatus comprising a first server module which receives access control to a storage in a format according to first standards, a transformer which transforms the access control to the storage from the format according to the first standards into a format according to second standards, and a second server module which accesses the storage using the access control having the transformed format according to the second standards.

According to another aspect of the present invention, there is provided a computer readable medium having recorded thereon a computer program for executing the third storage access method.

BRIEF DESCRIPTION OF THE DRAWINGS

The above and other aspects of the present invention will become more apparent by describing in detail exemplary embodiments thereof with reference to the attached drawings in which:

FIG. 6 is a block diagram of a UPnP MS proxy of FIG. 5 according to an exemplary embodiment of the present invention;

FIG. 7 is a section of computer code illustrating a format of an alive message according to an exemplary embodiment of the present invention;

FIG. 8 is a section of computer code illustrating a format of a UPnP device description according to an exemplary embodiment of the present invention;

FIG. 14 is a flowchart illustrating a UPnP storage access method according to another exemplary embodiment of the present invention.

DETAILED DESCRIPTION OF EXEMPLARY EMBODIMENTS OF THE INVENTION

Figure 1:
FIGS. 1 and 2 are block diagrams of related art home storage environments according to UPnP standards.
Figure 2:
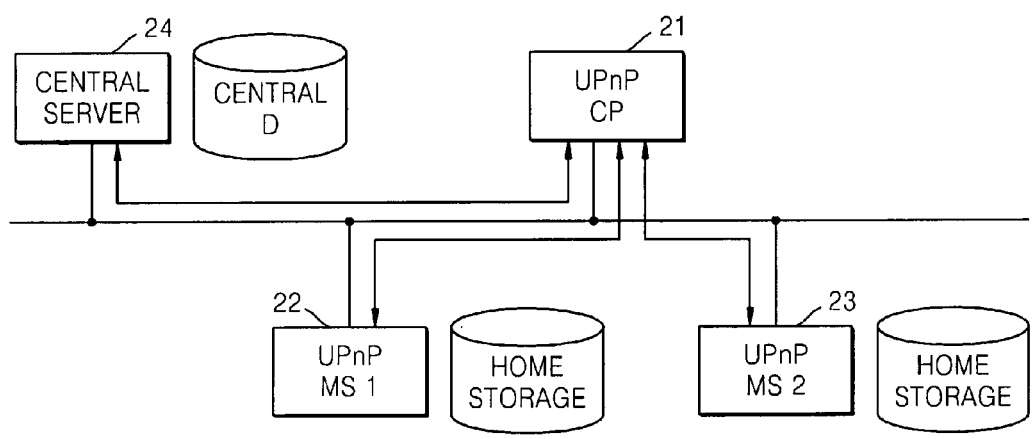
Figure 3:
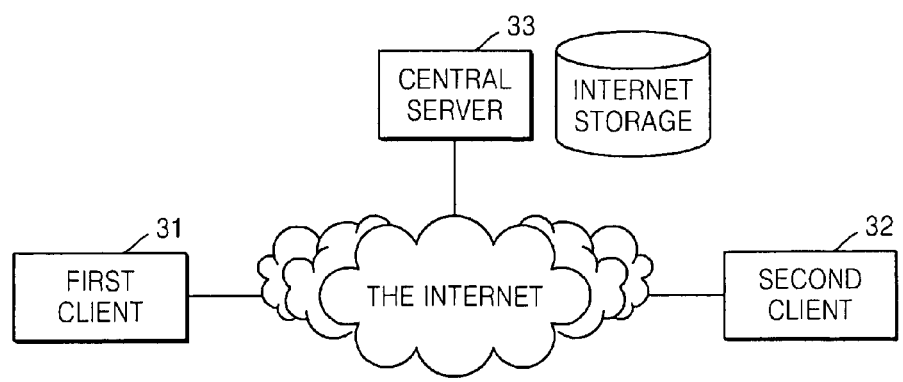
FIG. 3 is a block diagram of a related art Internet storage environment.
Figure 4:
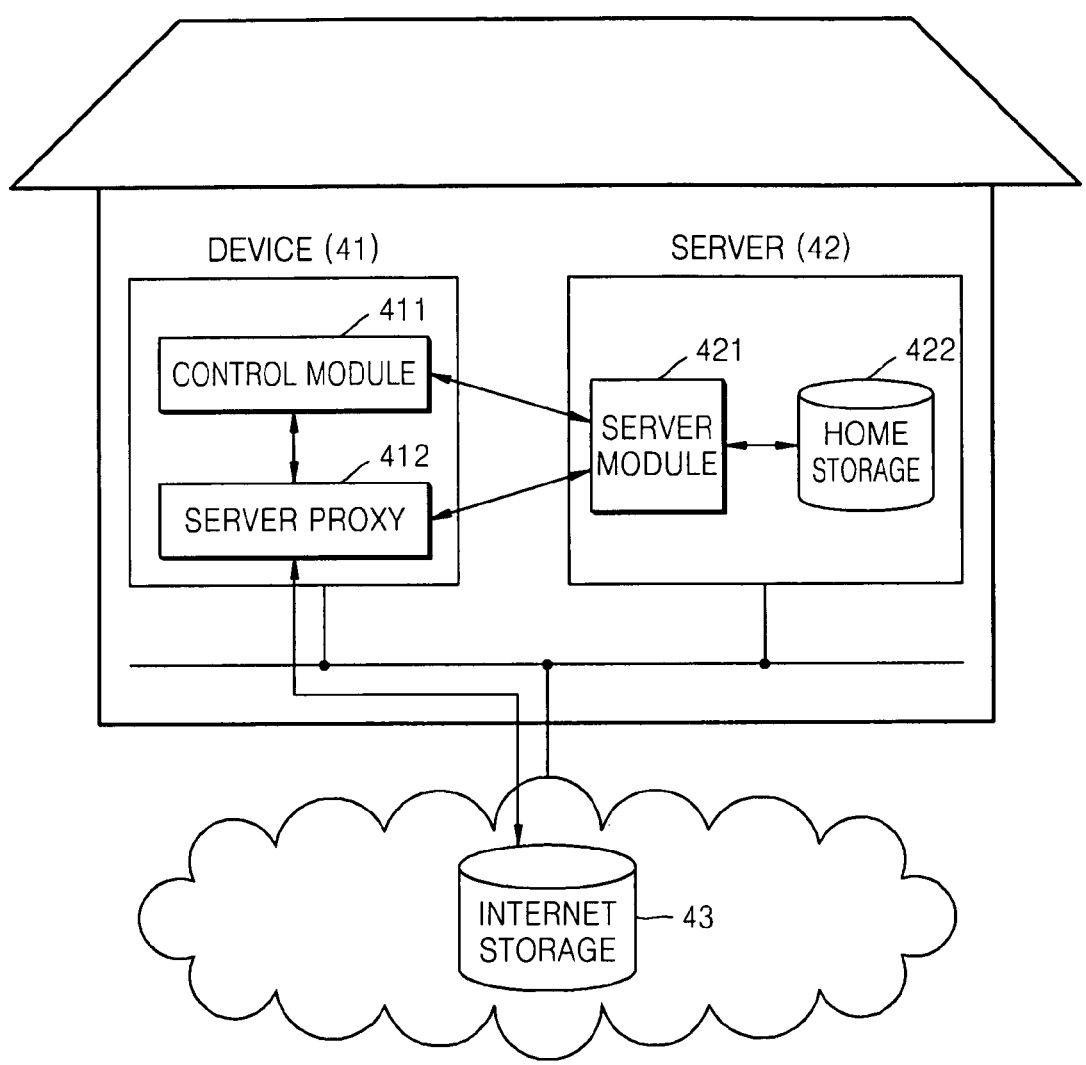
FIG. 4 is a block diagram of a storage access system according to an exemplary embodiment of the present invention.

FIG. 4 is a block diagram of a storage access system according to an exemplary embodiment of the present invention. Referring to FIG. 4, the storage access system includes a device 41, a server 42, and an Internet storage 43. In particular, the storage access system includes two storages, i.e. a home storage 422 and the Internet storage 43. Copies of content and meta data of the content stored in the home storage 422 are stored in the Internet storage 43 so that if access to the home storage 422 is not available, the Internet storage 43 which has higher access reliability than the home storage 422 is accessed, and therefore, copies of content and meta data of the content stored in the home storage 422 can be retrieved even when the access to the home storage 422 is not available. The home storage 422 is located in a home network and the Internet storage 43 is located in the Internet. Examples of Internet storages are a picture sharing system provided by an Internet service provider (ISP), an Internet disk service provided at http://idisk.megapass.net, a Distributed Hash Table (DHT) storage that is a set of storages distributed in the Internet, and so on. The home storage 422 and the Internet storage 43 may be physical devices such as hard discs, optical discs, and flash memory devices.

In general, when the server 42 is not in operation, for example, when the server 42 is powered off, access to the home storage 422 is not available. Thus, the fact that the access reliability of the Internet storage 43 is higher than that of the home storage 422 means that the home storage 422 is in operation less frequently than the Internet storage 43. That is, since the home storage 422 is located in the home network, it is very probable that the home storage 422 is frequently turned on/off by home users. In contrast, since the Internet storage 43 is located in the Internet and provided by an ISP, it is less probable that the Internet storage 43 is frequently turned on/off.

The device 41 includes a control module 411 and a server proxy 412.

The control module 411 controls access of a server module 421 of the server 42 to the home storage 422. In detail, the control module 411 controls access of the server module 421 to the home storage 422 by calling Application Program Interfaces (APIs) that perform various operations for access of the server module 421 to the home storage 422. In the current embodiment and the following exemplary embodiments of the present invention, access to a storage indicates a process of reading data from, or writing data to, the storage.

When the server module 421 of the server 42 is not in operation, the server proxy 412 acts as a server in place of the server module 421. In this case, the control module 411 regards the server proxy 412 as the server module 421. In detail, the server proxy 412 detects whether access of the server module 421 to the home storage 422, which is controlled by the control module 411, is available, and if the access is not available, the server proxy 412 accesses the Internet storage 43 which has higher access reliability than the home storage 422. That is, when detecting the access of the server module 421 to the home storage 422, which is controlled by the control module 411, is not available, the server proxy 412 accesses the Internet storage 43 in place of the server module 421 accessing the home storage 422.

More specifically, when detecting the access of the server module 421 to the home storage 422, which is controlled by the control module 411, is not available, the server proxy 412 receives calls from the control module 411 for APIs that perform various operations for gaining access to the home storage 422, in place of the server module 421. Next, in response to the calls for the APIs, the server proxy 412 performs the APIs on the Internet storage 43 in place of the home storage 422 so as to access the Internet storage 43, instead of the server module 421 accessing the home storage 422.

Figure 5:
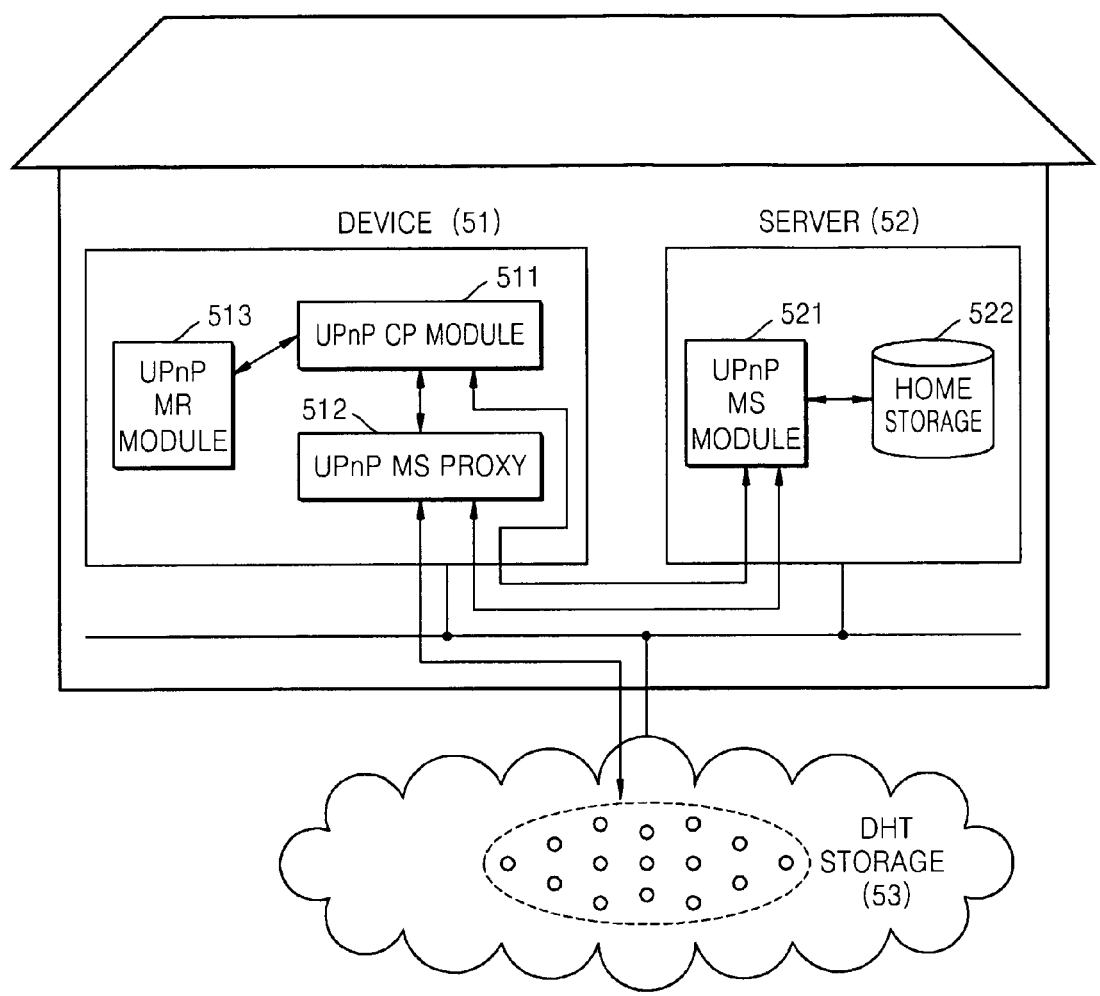
FIG. 5 is a block diagram of a UPnP storage access system according to an exemplary embodiment of the present invention.

FIG. 5 is a block diagram of a UPnP storage access system according to an exemplary embodiment of the present invention. Referring to FIG. 5, the UPnP storage access system includes a device 51, a server 52, and a DHT storage 53. In particular, the UPnP storage access system is realized by applying a UPnP network and the DHT storage 53 to the storage access system of FIG. 4.

The device 51 includes a UPnP Control Point (CP) module 511, a UPnP Media Server (MS) proxy 512, and a UPnP Media Renderer (MR) module 513.

The UPnP CP module 511 controls the UPnP MS module 521 of the server 52 by calling UPnP actions, which are types of APIs, for the UPnP MS module 521 or the UPnP MS proxy 512. In particular, the UPnP CP module 511 controls access of the UPnP MS module 521 of the server 52 to the home storage 522 by calling UPnP actions, such as Browse( ), Search( ), CreateObject( ), DestroyObject( ), ImportResource( ), and ExportResource( ). Also, the UPnP CP module 511 obtains return values for calling subsequent UPnP actions, such as Browse( ), Search( ), CreateObject( ), DestroyObject( ), ImportResource( ), ExportResource( ) by receiving from the UPnP MS proxy 512 the results of executing the UPnP actions.

When the UPnP MS module 521 of the server 52 is not in operation, the UPnP MS proxy 512 acts as a UPnP media server in place of the UPnP MS module 521. Thus, the UPnP CP module 511 regards the UPnP MS proxy 512 as the UPnP MS module 521. In particular, the UPnP MS proxy 512 detects whether access of the UPnP MS module 521 to the home storage 522 under control of the UPnP CP module 511 is available, and if the access is not available, the UPnP MS proxy 512 accesses the DHT storage 53 which has higher access reliability than the home storage 522. That is, when it is detected that the access of the UPnP MS module 521 to the home storage 522 under control of the UPnP CP module 511 is not available, the UPnP MS proxy 512 accesses the DHT storage 53 in place of access of the UPnP MS module 521 to the home storage 522.

More specifically, when it is detected that access of the UPnP MS module 521 of the server 52, which is controlled by the UPnP CP module 511, to the home storage 522 is not available, the UPnP MS proxy 512 receives UPnP actions, such as Browse( ), Search( ), CreateObject( ), DestroyObject( ), ImportResource( ), and ExportResource( ), from the UPnP CP module 511 in place of the UPnP MS module 521. Next, the UPnP MS proxy 512 executes the UPnP actions on the DHT storage 53 in place of the home storage 522 in response to the call for the UPnP actions, and accesses the DHT storage 53 in place of the access of the UPnP MS module 521 to the home storage 522.

FIG. 6 is a block diagram of the UPnP MS proxy 512 of FIG. 5 according to an exemplary embodiment of the present invention. Referring to FIG. 6, the UPnP MS proxy 512 includes a UPnP MS module 61, a transformer 62, and a DHT MS module 63.

The UPnP MS module 61 acts as a UPnP media server accessing the home storage 522 of FIG. 5 in place of the UPnP MS module 521. In particular, the UPnP MS module 61 receives access control to the home storage 522 by receiving a call for UPnP actions, such as Browse( ), Search( ), CreateObject( ), DestroyObject( ), ImportResource( ), and ExportResource( ) from the UPnP CP module 511. Also, the UPnP MS proxy 512 supplies the results of performing the UPnP actions by the transformer 62 to the UPnP CP module 511.

More specifically, the UPnP MS module 61 performs UPnP addressing. That is, the UPnP MS module 61 assigns an Internet protocol (IP) address of the UPnP MS module 61. Also, the UPnP MS module 61 performs UPnP discovery. That is, the UPnP MS module 61 generates an advertisement message (an alive message) indicating that the UPnP MS module 61 is connected to a network, based on the assigned IP address, and transmits it to the UPnP CP module 511.

FIG. 7 is a section of computer code illustrating a format of an alive message according to an exemplary embodiment of the present invention. Referring to FIG. 7, the alive message generated by the UPnP MS module 61 has a Hypertext Transfer Protocol (HTTP) document format according to UPnP standards. In particular, a location header of the alive message according to an exemplary embodiment of the present invention records a Uniform Resource Locator (URL) of a UPnP device description generated by the UPnP MS module 61, i.e. an IP address of the UPnP MS module 61 from which the UPnP device description is provided.

Also, the UPnP MS module 61 performs a UPnP description. That is, when the UPnP CP module 511 discovering the UPnP MS module 61 through the UPnP discovery accesses the URL recorded in the location header of the alive message illustrated in FIG. 7, the UPnP MS module 61 generates a UPnP device description and supplies it to the UPnP CP module 511. Information that the UPnP MS module 61 needs to generate the UPnP device description may be stored in the UPnP MS module 61, the home storage 522, or the DHT storage 53.

FIG. 8 is a section of computer code illustrating a format of a UPnP device description according to an exemplary embodiment of the present invention. Referring to FIG. 8, a UPnP device description generated by the UPnP MS module 61 of FIG. 6 has an XML document format according to UPnP standards. Furthermore, since the UPnP MS module 61 acts as a UPnP media server to access the home storage 522 in place of the UPnP MS module 521, the UPnP device description according to an exemplary embodiment of the present invention is the same as the existing UPnP device description regarding the UPnP MS module 521, but an IP address described in the UPnP device description is changed from the IP address of the UPnP MS module 521 to the IP address of the UPnP MS module 61.

Also, the UPnP MS module 61 performs UPnP control. That is, the UPnP MS module 61 performs an action corresponding to the control operation of the UPnP CP module 511 acquiring a description regarding the UPnP MS module 61 through the UPnP description.

Also, the UPnP MS module 61 performs UPnP eventing. That is, the UPnP MS module 61 transmits an event message, containing information regarding an event provided by the UPnP MS module 61, to the UPnP CP module 511 that controls the UPnP MS module 61 to correspond to UPnP control. For example, the UPnP MS module 61 transmits an event of UPnP content directory service events, which indicates a system update ID parameter SystemUpdateID, as an initial event message. If at least one in a content directory changes, the system update ID parameter SystemUpdateID is changed.

In an embodiment of the present invention, eventing according to UPnP standards is not supported by the DHT MS module 63, since it is a module that performs only an action for gaining access to the DHT storage 53 according to DHT standards. However, if the eventing according to UPnP standards, such as a content update event, is supported by the DHT MS module 63, the transformer 62 transforms the format of an event provided by the DHT MS module 63 into an event format according to UPnP standards, and transmits the transformed event to the UPnP MS module 61. In this case, the UPnP MS module 61 can perform UPnP eventing.

The transformer 62 transforms access controls from a format for the home storage 522 according to UPnP standards into a format for the DHT storage 53 according to DHT standards. Specifically, the transformer 62 transforms the formats of UPnP actions received by the UPnP MS module 61, such as Browse( ), Search( ), CreateObject( ), DestroyObject( ), ImportResource( ), and ExportResource( ), according to UPnP standards, into the formats of APIs, such as Get(key), Put(key, value), Destroy(key), Update(key, value), Join(node), and Leave(node), according to DHT standards.

Also, the transformer 62 transforms the format of a value obtained by access of the DHT MS module 63 to the DHT storage 53 into the format of a value obtained by access to the home storage 522 according to UPnP standards. More specifically, the transformer 62 transforms the format of a value obtained by executing APIs, such as Get(key), Put(key, value), Destroy(key), Update(key, value), Join(node), and Leave(node), by the DHT MS module 63 into the format of a value obtained by executing UPnP actions, such as Browse( ), Search( ), CreateObject( ), DestroyObject( ), ImportResource( ), and ExportResource( ), according to UPnP standards.

For example, when the UPnP CP module 511 calls Browse (root directory), the UPnP MS module 61 receives the call and informs the transformer 62 that Browse(root directory) was called by the UPnP CP module 511. Then, the transformer 62 transforms the format of storage access control according to a pseudo code illustrated in FIG. 9.

Figure 9:
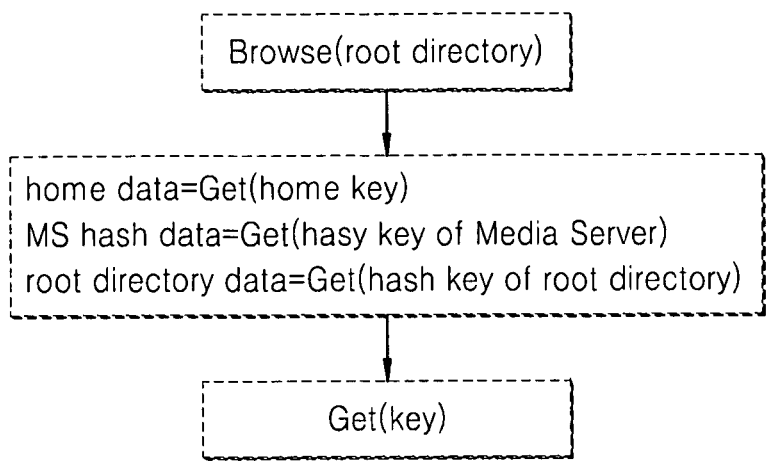
FIG. 9 is a section of computer code illustrating an example of pseudo code for transforming a storage access control format according to an exemplary embodiment of the present invention.

FIG. 9 is a section of computer code illustrating an example of pseudo code for transforming the format of storage access control according to an exemplary embodiment of the present invention. Referring to FIG. 9, the pseudo code is an example of code used to transform Browse(root directory) called by the UPnP CP module 511 into Get(key) according to DHT standards. When the UPnP MS module 61 informs the transformer 62 of a call for Browse(root directory), the transformer 62 calls Get(home key), with respect to the DHT MS module 63, using a home key corresponding to a home network in order to obtain home data from a return value of the call for Get(home key). Here, the home data refers to a home network, and includes hash keys of media servers in the home network, and especially, a hash key of the UPnP MS module 521.

Next, the transformer 62 calls Get(hash key of Media Server) with respect to the DHT MS module 63 by using the hash key of the UPnP MS module 521, and obtains hash data of the UPnP MS module 521 from a return value of the call for Get(hash key of Media Server). The hash data of the UPnP MS module 521 includes hash keys of a directory of the UPnP MS module 521, and particularly, a hash key of a root directory of the UPnP MS module 521.

Next, the transformer 62 calls Get(hash key of root directory) with respect to the DHT MS module 63 by using the hash key of the root directory of the UPnP MS module 521, and obtains root directory data of the UPnP MS module 521 from a return value of the call for Get(hash key of root directory). The root directory data contains meta data regarding a child directory, items, etc. of the root directory of the UPnP MS module 521. Next, the transformer 62 transforms the format of the obtained root directory data into the format of a return value of a call for Browse(root directory) according to UPnP standards, and transmits the transformed root directory data to the DHT MS module 63.

The DHT MS module 63 acts as a DHT media server accessing the DHT storage 53 to correspond to an operation performed by the UPnP MS module 61. That is, the DHT MS module 63 acts as the DHT media server that provides APIs, such as Get(key), Put(key, value), Destroy(key), Update(key, value), Join(node), and Leave(node), according to DHT standards. Get(key) is an API that performs detection of a value from the DHT storage 53 using the hash key and returns a value to correspond to UPnP standards. Put(key, value) is an API that stores the hash key and the value corresponding to UPnP standards of the hash key in the DHT storage 53. Destroy(key) is an API that deletes the hash key and the value corresponding to UPnP standards of the hash key from the DHT storage 53. Update(key, value) is an API that performs updating the value corresponding to UPnP standards of the hash key. Join(node) is an API that allows a new node to join the DHT storage 53. Leave(node) is an API that allows an existing node to leave the DHT storage 53.

In particular, the DHT MS module 63 accesses the DHT storage 53 which has higher access reliability than the home storage 522 to correspond to an operation of the UPnP MS module 61. That is, the DHT MS module 63 accesses the DHT storage 53 according to an access control format transformed by the transformer 62, and obtains the accessing result. More specifically, the DHT MS module 63 accesses the DHT storage 53 by executing APIs, such as Get(key), Put(key, value), Destroy(key), Update(key, value), Join(node), and Leave(node), which are transformed by the transformer 62 according to DHT standards, and obtains the accessing result.

Referring to FIG. 5, the UPnP MR module 513 acts as a UPnP media renderer. In particular, according to an exemplary embodiment of the present invention, the UPnP MR module 513 performs rendering on the content obtained as the result of calling ExportResource( ) by the UPnP CP module 511.

An operation of reading data from the DHT storage 53 under control of the UPnP CP module 511 will now be described. The UPnP MS module 61 receives a call for Browse( ) from the UPnP CP module 511, and provides the UPnP CP module 511 with a browse for objects of a content directory as a result value of the call for Browse( ). Next, the UPnP CP module 511 reads data from the DHT storage 53 by calling ExportResource( ) that instructs content of one of the objects of the content directory to be exported from the DHT storage 53 to the UPnP MR module 513.

An operation of writing data to the DHT storage 53 under control of the UPnP CP module 511 will now be described. The UPnP MS module 61 receives a call for CreateObject( ) from the UPnP CP module 511, and creates a new object in a UPnP content directory. Next, the UPnP CP module 511 assigns identification of the created new object as a result of the call for CreateObject( ) from the UPnP MS module 61, and calls ImportResource( ) that instructs content of an object corresponding to the assigned identification to be imported to the DHT storage 53 in order to write data to the DHT storage 53.

The UPnP CP module 511 periodically determines whether content meta data present in the home network is the same as content meta data in the content and the DHT storage 53. If it is not the same, the UPnP CP module 511 reflects the difference therebetween.

Figure 10:
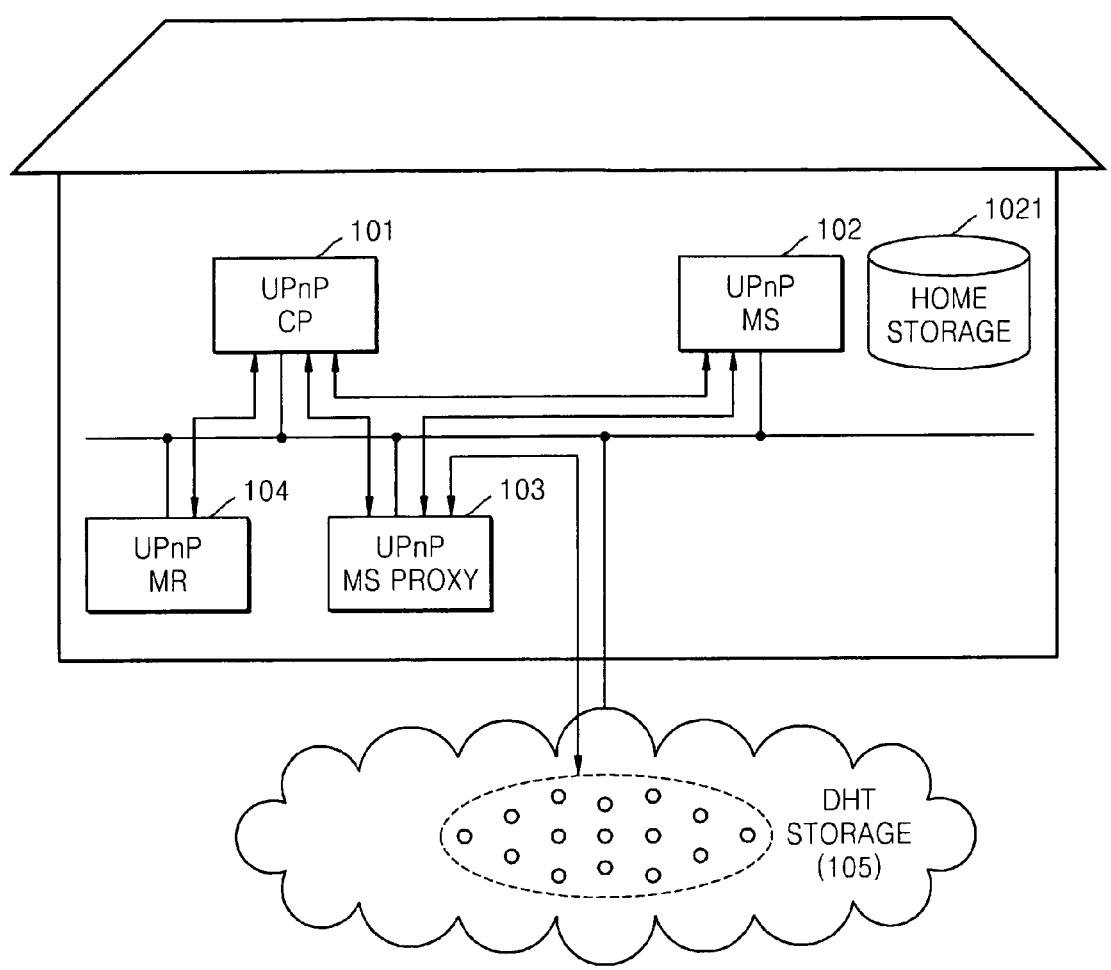
FIG. 10 is a block diagram of a UPnP storage access system according to another exemplary embodiment of the present invention.

FIG. 10 is a block diagram of a UPnP storage access system according to another exemplary embodiment of the present invention. Referring to FIG. 10, the UPnP storage access system includes a UPnP CP 101, a UPnP MS 102, a UPnP MS proxy 103, a UPnP MR 104, and a DHT storage 105. Compared to the UPnP storage access system illustrated in FIG. 5, the UPnP CP 101, the UPnP MS 102, the UPnP MS proxy 103, and the UPnP MR 104 correspond to the UPnP CP module 511, the UPnP MS module 521, the UPnP MS proxy 512, and the UPnP MR module 513, respectively. That is, the UPnP storage access system of FIG. 10 shows that the UPnP CP module 511, the UPnP MS proxy 512, and the UPnP MR module 513 which constitute the device 51 of FIG. 5 may be present as separate devices.

Figure 11:
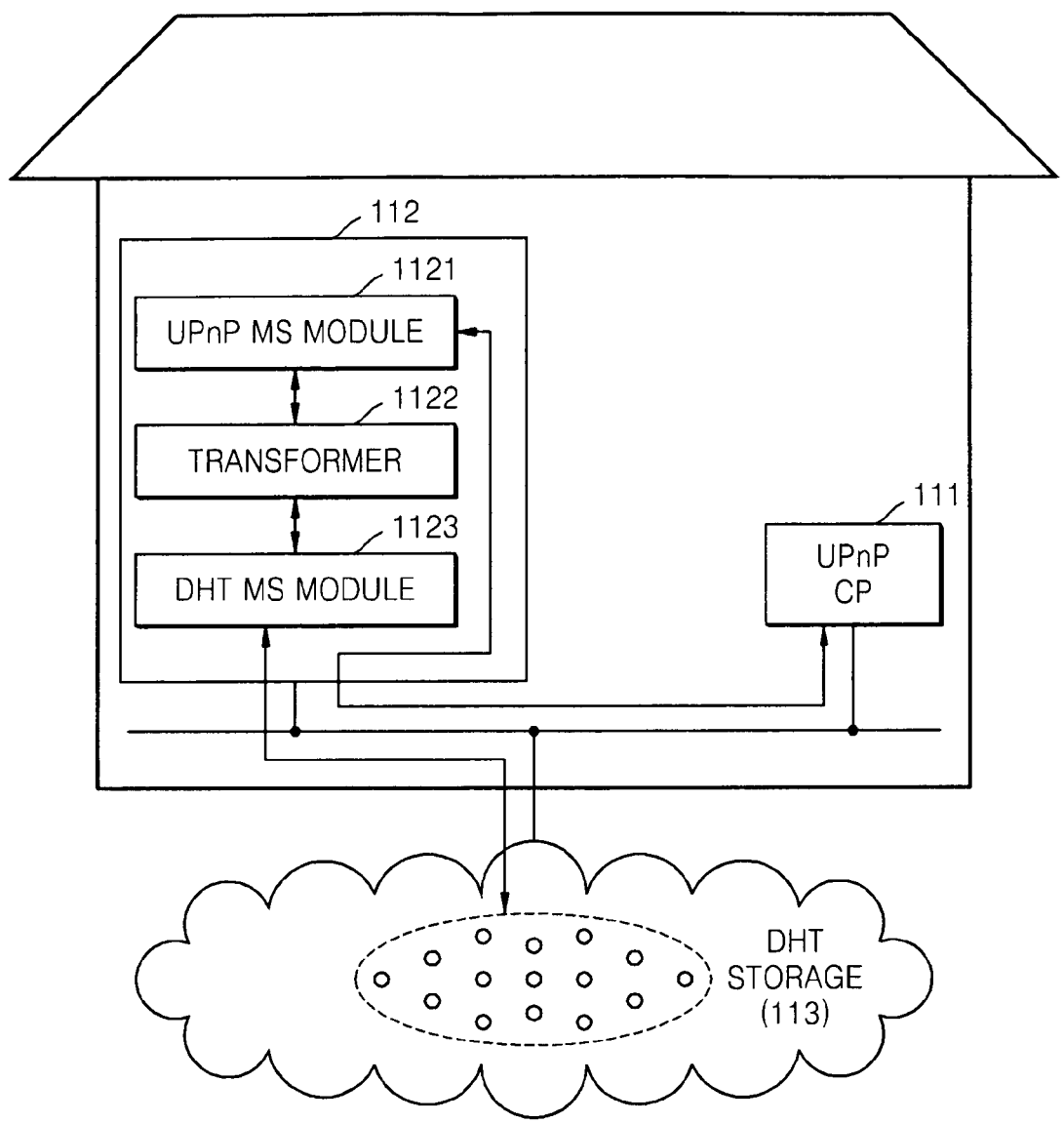
FIG. 11 is a block diagram of a UPnP storage access system according to another exemplary embodiment of the present invention.

FIG. 11 is a block diagram of a UPnP storage access system according to another exemplary embodiment of the present invention. Referring to FIG. 11, the storage access system includes a UPnP CP 111, a device 112, and a DHT storage 113. In particular, unlike the storage access systems shown in FIGS. 5 and 10, the UPnP storage access system of FIG. 11 includes only a DHT storage 113 without a home storage. That is, the DHT storage 113 acts as the home storage 522 and the home storage 1021 illustrated in the storage access systems shown in FIGS. 5 and 10, respectively.

The UPnP CP 111 calls UPnP actions, which are various types of APIs, with respect to a UPnP MS module 1121 of the device 112 in order to control the UPnP MS module 1121. In particular, the UPnP CP 111 calls UPnP actions, such as Browse( ), Search( ), CreateObject( ), DestroyObject( ), ImportResource( ), and ExportResource( ), in order to control access of the UPnP MS module 1121 to the DHT storage 113.

Also, the UPnP CP 111 receives from the device 112 values obtained by executing the UPnP actions, as return values of the call for the UPnP actions.

Referring to FIG. 11, the device 112 also includes a transformer 1122 and a DHT MS module 1123 as well as the UPnP MS module 1121.

The UPnP MS module 1121 acts as a UPnP media server accessing the DHT storage 113. More specifically, the UPnP MS module 1121 performs UPnP addressing, discovery, control, and eventing like the UPnP MS module 61 of FIG. 6. However, unlike the UPnP MS module 61 of FIG. 6, the UPnP MS module 1121 does not take the place of another UPnP MS module, and therefore, creates a UPnP device description without using the existing UPnP device description of another UPnP MS module. In particular, the UPnP MS module 1121 gains control of access to the DHT storage 113 according to UPnP standards by receiving a call for UPnP actions, such as Browse( ), Search( ), CreateObject( ), DestroyObject( ), ImportResource( ), and ExportResource( ), from the UPnP CP 111. Also, the UPnP MS module 1121 supplies the result of executing the UPnP actions, such as Browse( ), Search( ), CreateObject( ), DestroyObject( ), ImportResource( ), and ExportResource( ), which are transformed by the transformer 1122, to the UPnP CP 111.

The transformer 1122 transforms access controls for the DHT storage 113 from a format according to UPnP standards, which is received by the UPnP MS module 1121, into a format according to DHT standards. In detail, the transformer 1122 transforms UPnP actions, such as Browse( ), Search( ), CreateObject( ), DestroyObject( ), ImportResource( ), and ExportResource( ), from a format according to UPnP standards, which are received by the UPnP MS module 1121, into a format of APIs according to DHT standards, such as Get (key), Put(key, value), Destroy(key), Update(key, value), Join (node), and Leave(node). That is, like the transformer 62 of FIG. 6, the transformer 1122 can transform the format of storage access control according to the pseudo code illustrated in FIG. 9.

Also, the transformer 1122 transforms the format of an access control of the DHT storage 113 according to DHT standards, which is received by the DHT MS module 1123, into the format of an access control of the DHT storage 113 according to UPnP standards. In detail, the transformer 1122 transforms the format of the result of executing APIs, such as Get(key), Put(key, value), Destroy(key), Update(key, value), Join(node), and Leave(node), which are obtained by the DHT MS module 1123, into the format of UPnP actions, such as Browse( ), Search( ), CreateObject( ), DestroyObject( ), ImportResource( ), and ExportResource( ), according to the UPnP standards.

The DHT MS module 1123 acts as a DHT media server accessing the DHT storage 113 to correspond to an operation performed by the UPnP MS module 1121. In particular, the DHT MS module 1123 accesses the DHT storage 113 according to a format of access control transformed by the transformer 1122, and obtains the accessing result. Specifically, the DHT MS module 1123 accesses the DHT storage 113 by executing APIs, such as Get(key), Put(key, value), Destroy (key), Update(key, value), Join(node), and Leave(node), according to DHT standards, which are transformed by the transformer 1122, and obtains the accessing result.

Figure 12:
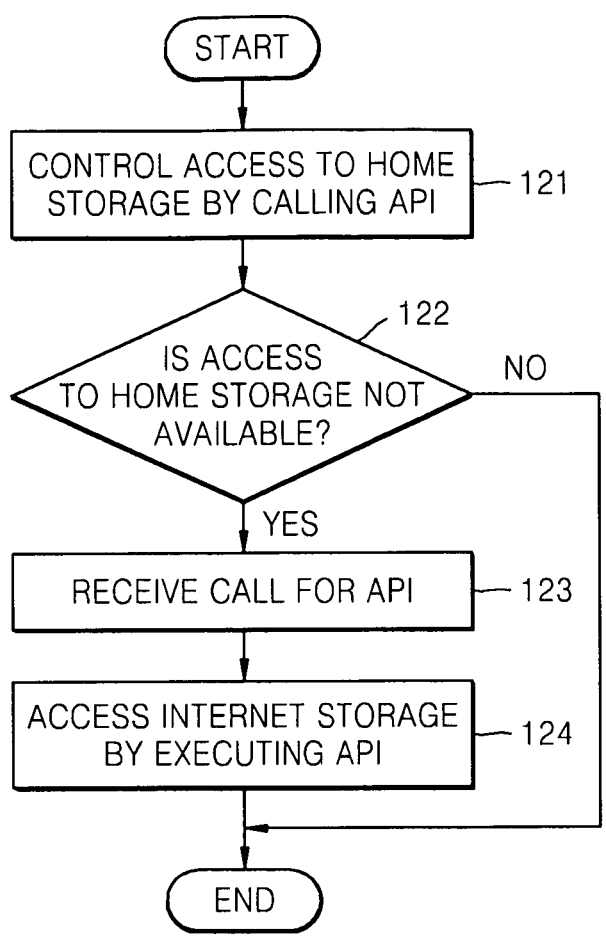
FIG. 12 is a flowchart illustrating a storage access method according to an exemplary embodiment of the present invention.

FIG. 12 is a flowchart illustrating a storage access method according to an exemplary embodiment of the present invention. Referring to FIG. 12, the storage access method includes operations performed by the storage access system of FIG. 4. Therefore, although not described here, the above description regarding the storage access system of FIG. 4 is also applied to the storage access method of FIG. 12.

Referring to FIG. 12, in operation 121, the control module 411 controls access of the server module 421 of the server 42 to the home storage 422 by calling APIs that perform operations required for the server module 421 of the server 42 to access the home storage 422.

In operation 122, if it is determined that access of the server module 421 to the home storage 422 under control of the control module 411 is not available, the server proxy 412 performs operation 123. If the access is available, the storage access method is discontinued.

In operation 123, the server proxy 412 receives a call for APIs that perform operations to gain access to the home storage 422 from the control module 411, in place of the server module 421.

In operation 124, the server proxy 412 accesses the Internet storage 43 instead of the server module 421 accessing the home storage 422 by executing the APIs with respect to the Internet storage 43, not the home storage 422, in response to the execution of the APIs.

Figure 13:
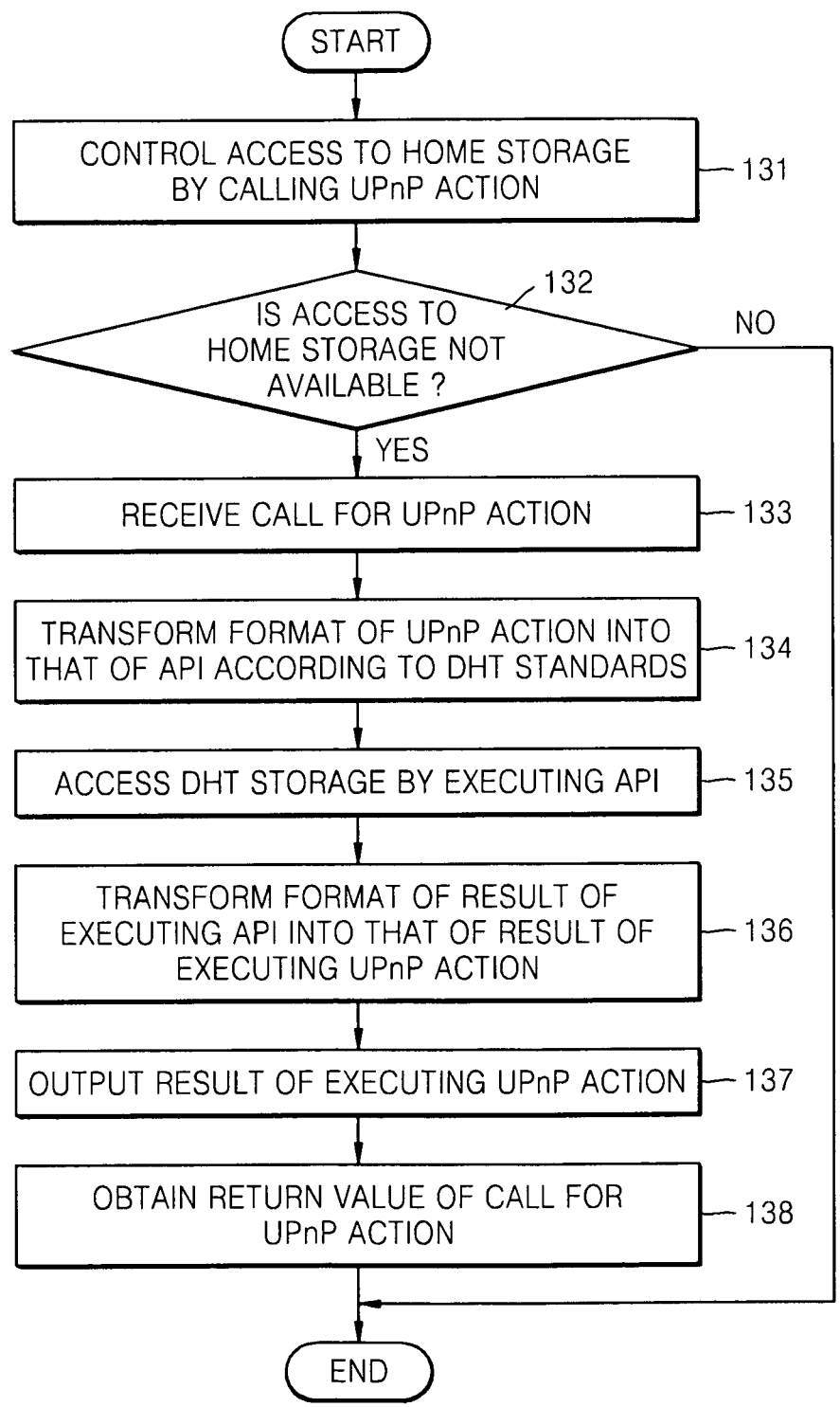
FIG. 13 is a flowchart illustrating a UPnP storage access method according to an exemplary embodiment of the present invention.

FIG. 13 is a flowchart illustrating a UPnP storage access method according to an exemplary embodiment of the present invention. Referring to FIG. 13, the UPnP storage access method includes operations performed by the UPnP storage access system illustrated in FIGS. 5 and 6. Thus, although not described here, the above description of the UPnP storage access system FIGS. 5 and 6 is also applied to the UPnP storage access method of FIG. 13.

Referring to FIG. 13, in operation 131, the UPnP CP module 511 calls UPnP actions, such as Browse( ), Search( ), CreateObject( ), DestroyObject( ), ImportResource( ), and ExportResource( ), to control access of the UPnP MS module 521 of the server 52 to the home storage 522.

In operation 132, if it is determined that access of the UPnP MS module 521 to the home storage 522 under control of the UPnP CP module 511 is not available, the UPnP MS proxy 512 performs operation 133. If the access is available, the UPnP storage access method is discontinued.

In operation 133, the UPnP MS proxy 512 receives a call for UPnP actions, such as Browse( ), Search( ), CreateObject( ), DestroyObject( ), ImportResource( ), and ExportResource( ), from the UPnP CP module 511 so as to gain access control to the home storage 522.

In operation 134, the UPnP MS proxy 512 transforms the format of the UPnP actions, such as Browse( ), Search( ), CreateObject( ), DestroyObject( ), ImportResource( ), and ExportResource( ), according to UPnP standards, which are received in operation 133, into the format of APIs, such as Get(key), Put(key, value), Destroy(key), Update(key, value), Join(node), and Leave(node), according to DHT standards.

In operation 135, the UPnP MS proxy 512 accesses the DHT storage 53 by executing the APIs, such as Get(key), Put(key, value), Destroy(key), Update(key, value), Join (node), and Leave(node), according to DHT standards, which are transformed in operation 134, and obtains the accessing result.

In operation 136, the UPnP MS proxy 512 transforms the format of the result of executing the APIs, such as Get(key), Put(key, value), Destroy(key), Update(key, value), Join (node), and Leave(node), which are obtained in operation 135, into the format of the result of executing UPnP actions, such as Browse( ), Search( ), CreateObject( ), DestroyObject( ), ImportResource( ), and ExportResource( ), according to UPnP standards.

In operation 137, the UPnP MS proxy 512 supplies the result of executing the UPnP actions, such as Browse( ), Search( ), CreateObject( ), DestroyObject( ), ImportResource( ), and ExportResource( ), which are obtained in operation 136, to the UPnP CP module 511.

In operation 138, the UPnP CP module 511 receives the result of executing UPnP actions, such as Browse( ), Search( ), CreateObject( ), DestroyObject( ), ImportResource( ), and ExportResource( ), which are supplied in operation 137, as a return value of the call for the UPnP actions.

FIG. 14 is a flowchart illustrating a UPnP storage access method according to another exemplary embodiment of the present invention. The UPnP storage access method of FIG. 14 includes operations performed by the UPnP storage access system of FIG. 11. Although not described here, the above description regarding the UPnP storage access system of FIG. 11 is also applied to the UPnP storage access method of FIG. 14.

Referring to FIG. 14, in operation 141, the UPnP CP 111 controls access of the UPnP MS module 1121 of the device 112 to the DHT storage 113 by calling UPnP actions, such as Browse( ), Search( ), CreateObject( ), DestroyObject( ), ImportResource( ), and ExportResource( ).

In operation 142, the device 112 gains control of access to the DHT storage 113 according to UPnP standards by receiving a call for UPnP actions, such as Browse( ), Search( ), CreateObject( ), DestroyObject( ), ImportResource( ), and ExportResource( ), from the UPnP CP 111.

In operation 143, the device 112 transforms the format of the UPnP actions, such as Browse( ), Search( ), CreateObject( ), DestroyObject( ), ImportResource( ), and ExportResource( ), according to UPnP standards, which are received in operation 142, into the format of APIs, such as Get(key), Put(key, value), Destroy(key), Update(key, value), Join(node), and Leave(node), according to DHT standards.

In operation 144, the device 112 accesses the DHT storage 113 by executing the APIs, such as Get(key), Put(key, value), Destroy(key), Update(key, value), Join(node), and Leave (node), according to DHT standards which are transformed in operation 143, and obtains the accessing result.

In operation 145, the device 112 transforms the format of the result of executing the APIs, such as Get(key), Put(key, value), Destroy(key), Update(key, value), Join(node), and Leave(node), which are obtained in operation 144, into the format of the result of executing the UPnP actions, such as Browse( ), Search( ), CreateObject( ), DestroyObject( ), ImportResource( ), and ExportResource( ), according to UPnP standards.

In operation 146, the device 112 supplies the result of executing the UPnP actions, such as Browse( ), Search( ), CreateObject( ), DestroyObject( ), ImportResource( ), and ExportResource( ), which are transformed in operation 145, to the UPnP CP 111.

In operation 147, the UPnP CP module 111 receives the result of executing the UPnP actions, such as Browse( ), Search( ), CreateObject( ), DestroyObject( ), ImportResource( ), and ExportResource( ), which are supplied in operation 146, as a return value of the call for the UPnP actions, such as Browse( ), Search( ), CreateObject( ), DestroyObject( ), ImportResource( ), and ExportResource( ).

The above exemplary embodiments of the present invention can be embodied as a computer readable program, and executed in a general digital computer that executes the program by using a computer readable medium. Also, the data structures used in the above embodiments can be recorded in a computer readable medium via various devices.

Examples of the computer readable medium include a magnetic storage medium (e.g., a ROM, a floppy disk, a hard disc, etc.), and an optical recording medium (e.g., a CD-ROM, a DVD, etc.).

According to the exemplary embodiments of the present invention, it is detected whether access to a home storage is available, and an Internet storage which has higher access reliability than the home storage is accessed, when the access to the home storage is not available. Accordingly, even if the home storage is not in operation, for example, when the home storage is turned off, it is possible to obtain content and meta data of the content.

The exemplary embodiments of the present invention introduce a proxy that acts as a UPnP media server in place of a UPnP media server module accessing the home storage, and accesses the Internet storage which has higher access reliability than the home storage to correspond to UPnP media server, thereby being compatible with the existing UPnP standards. As a result, it is possible to minimize a change in the home storage environment according to UPnP standards, caused by application of conventional environments. In particular, according to the exemplary embodiments of the present invention, when a DHT storage is used as the Internet storage, the advantages of the DHT storage, such as data redundancy and location transparency, can be applied to the home storage environment.

Also, according to the exemplary embodiments of the present invention, the home storage is accessed first, and the Internet storage is accessed when the access to the home storage is not available. That is, it is not always necessary to upload and download content via the Internet, thereby reducing Internet traffic.

While the present invention has been particularly shown and described with reference to exemplary embodiments thereof, it will be understood by those skilled in the art that various changes in form and details may be made therein without departing from the spirit and scope of the invention as defined by the appended claims.

What is claimed is:

1. A method of accessing storage comprising:
controlling, by a device, access to a first storage;
transforming access control format related to first standards used for the first storage into an access control format related to second standards used for a second storage in response to determination that the access to the first storage is not available; and
accessing a second storage having higher access reliability than the first storage by proxy of a server module included in the device, in response to failure of the access of the server module to the first storage, based on the determination, using the transformed access control format,
wherein the first storage is implemented in a server located in a home network, and the second storage is located in a network outside the home network.

2. The method of claim 1, further comprising controlling access of the server proxy to the second storage instead of the first storage, if it is detected that the access of the server module to the first storage is not available.

3. The method of claim 1, wherein during the controlling the access to the first storage, the access to the first storage is controlled by calling an application program interface (API) which performs an operation to gain access to the first storage, and during the accessing the second storage, the second storage is accessed by executing the API for the second storage instead of the first storage, in response to the calling the API.

4. The method of claim 3, wherein the API is a universal plug and play (UPnP) action.

5. A storage access apparatus comprising:
- a control module which controls access to a first storage;
- a transformer which transforms an access control format related to first standards used for the first storage into an access control format related to second standards used for the second storage in response to a determination that the access to the first storage is not available; and
- a server proxy which accesses a second storage having the higher access reliability than the first storage, in response to failure of the access of a server module to the first storage, based on the determination, using the transformed access control format,
- wherein the first storage is implemented in a server located in a home network, and the second storage is located in a network outside the home network.

6. A non-transitory computer readable medium having recorded thereon a computer program for executing a method of accessing storage, the method comprising:
- controlling, by a device, access to a first storage;
- transforming an access control format related to first standards used for the first storage into an access control format related to second standards used for the second storage in response to a determination that the access to the first storage is not available; and
- accessing a second storage having higher access reliability than the first storage by a server proxy, included in the device, in response to failure of the access of a server module to the first storage, based on the determination, using the transformed access control format,
- wherein the first storage is implemented in a server located in a home network, and the second storage is located in a network outside the home network.

7. A method of accessing storage comprising:
- performing an operation of a server proxy included in a device as a server accessing a first storage in place of a server module accessing the first storage;
- transforming in response to a determination that access to the first storage is not available an access control format related to first standards used for the first storage into an access control format related to second standards used for the second storage, corresponding to the operation performed by the server proxy; and
- accessing a second storage having higher access reliability than the first storage by the server proxy, in response to failure of the server module accessing the first storage, based on the determination, using the transformed access control format,
- wherein the first storage is implemented in a server located in a home network, and the second storage is located in a network outside the home network.

8. The method of claim 7, wherein during the transforming the access control format, an application program interface (API) for gaining access to the first storage in the access control format related to the first standards is transformed into the access control format related to the second standards for gaining access to the second storage, and
- during the accessing the second storage, the second storage is accessed by executing the API in the access control format related to the second standards.

9. The method of claim 7, further comprising:
- obtaining a result of the accessing the second storage; and
- transforming the result of the accessing the second storage from the access control format related to the second standards into the access control format related to the first standards of accessing the first storage.

10. The method of claim 7, wherein the first standards are universal plug and play (UPnP) standards, and the second standards are Distributed Hash Table (DHT) standards.

11. A storage access apparatus comprising:
- a first server module which acts as a server accessing a first storage in place of an existing server module accessing the first storage;
- a transformer which in response to a determination that access to the first storage is not available transforms an access control format related to first standards used for the first storage into an access control format related to second standards used for the second storage, corresponding to the operation performed by the server proxy; and
- a second server module which accesses a second storage having higher access reliability than the first storage, response to failure of the existing server module accessing the first storage, based on the determination, using the transformed access control format,
- wherein the first storage is implemented in a server located in a home network, and the second storage is located in a network outside the home network.

12. A non-transitory computer readable medium having recorded thereon a computer program for executing a method of accessing storage, the method comprising:
- performing an operation of a server proxy as a server accessing a first storage in place of a server module accessing the first storage;
- transforming in response to a determination that access to the first storage is not available an access control format related to first standards used for the first storage into an access control format related to second standards used for the second storage, corresponding to the operation performed by the server proxy; and
- accessing a second storage having higher access reliability than the first storage, corresponding to the operation performed by the server proxy, in response to failure of the server module accessing the first storage, based on the determination, using the transformed access control format,
- wherein the first storage is implemented in a server located in a home network, and the second storage is located in a network outside the home network.

13. A method of accessing storage comprising:
- receiving a request for accessing a first storage from a control module in a device;
- accessing a first storage in response to the request,
- wherein a server module delegates a server proxy included in the device to access a second storage having higher access reliability than the first storage, in response to failure of accessing the first storage, by using an access control format transformed for accessing the second storage in response to determining that the accessing to the first storage is not available,
- wherein the first storage is implemented in a server located in a home network, and the second storage is located in a network outside the home network.

14. The method of claim 13, further comprising, accessing to the second storage instead of the first storage, if it is detected that the access of the server module to the first storage is not available.

15. The method of claim 13, further comprising, transmitting a request for accessing the first storage to a server proxy or the control module if the accessing of the server module to the first storage is not available.

16. The method of claim 13, wherein during the controlling the access to the first storage, the access to the first storage is controlled by calling an application program interface (API) which performs an operation to gain access to the first storage, and during the accessing the second storage, the second storage is accessed by executing the API for the second storage instead of the first storage, in response to the calling the API.

17. A home server apparatus comprising:
a first storage which stores content and provide the content to a device; and
a server module configured to receive a request for accessing a first storage from a control module in the device, access to the first storage in response to the request, and delegate a server proxy to access a second storage having higher access reliability than the first storage, in response to failure of accessing the first storage, by using an access control format transformed for accessing the second storage in response to a determination that the access to the first storage is not available.

18. A method of accessing an internet storage comprising:
receiving a request for accessing the internet storage from a device in response to a determination that access to a home storage is not available; and
retrieving the internet storage having higher access reliability than the home storage by a server proxy, in response to failure of retrieving the home storage by a server module, based on the determination, using an access control format transformed for accessing the second storage in response to the request; and
providing the retrieved content corresponding to the request to the device,
wherein the home storage is implemented in a server located in a home network, and the second storage is located in a network outside the home network.

19. The method of claim 18, wherein the internet storage stores copies of content and meta data of the content stored in the home storage.

20. An Internet storage apparatus comprising:
a storage which stores copies of content and meta data of the content stored in a home storage; and
a central server configured to receive a request for accessing the internet storage from a device in response to a determination that access to the home storage is not available, retrieve the internet storage having higher access reliability than the first storage by a server proxy in response to failure of, retrieving the home storage by a server module, by using an access control format transformed for accessing the second storage in response to the request, and provide the retrieved content corresponding to the request to the device,
wherein the home storage is implemented in a server located in a home network, and the second storage is located in a network outside the home network.

* * * * *